(12) United States Patent
Park et al.

(10) Patent No.: US 10,678,829 B2
(45) Date of Patent: Jun. 9, 2020

(54) CUSTOMIZED DATA FEEDS FOR ONLINE SOCIAL NETWORKS

(71) Applicant: Microsoft Technology Licensing, LLC, Redmond, WA (US)

(72) Inventors: Sang Hyun Park, Sunnyvale, CA (US); Sui Yan, Sunnyvale, CA (US); Yongzheng Zhang, San Jose, CA (US); Ho Joon Park, Cupertino, CA (US); Weidong Zhang, San Jose, CA (US); Chi-Yi Kuan, Fremont, CA (US); Yi Zheng, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 163 days.

(21) Appl. No.: 15/484,371

(22) Filed: Apr. 11, 2017

(65) Prior Publication Data

US 2018/0293306 A1     Oct. 11, 2018

(51) Int. Cl.
| | | |
|---|---|---|
| *G06F 7/02* | (2006.01) |
| *G06F 16/00* | (2019.01) |
| *G06F 16/35* | (2019.01) |
| *H04L 12/58* | (2006.01) |
| *H04L 29/08* | (2006.01) |
| *G06F 16/338* | (2019.01) |
| *G06F 16/34* | (2019.01) |
| *H04L 29/06* | (2006.01) |
| *G06F 16/2457* | (2019.01) |

(52) U.S. Cl.
CPC ............ *G06F 16/35* (2019.01); *G06F 16/338* (2019.01); *G06F 16/345* (2019.01); *H04L 51/14* (2013.01); *H04L 51/32* (2013.01); *H04L 67/02* (2013.01); *H04L 67/04* (2013.01); *H04L 67/20* (2013.01); *H04L 67/306* (2013.01); *H04L 67/42* (2013.01); *G06F 16/24575* (2019.01)

(58) Field of Classification Search
CPC ...... G06F 16/338; G06F 16/35; G06F 16/345; G06F 16/24575; G06F 16/9537; G06F 16/9038; H04L 67/306; H04L 51/32; H04L 67/20; G06Q 30/02; G06Q 50/01
See application file for complete search history.

(56) References Cited

U.S. PATENT DOCUMENTS

| | | | | |
|---|---|---|---|---|
| 2010/0119053 A1* | 5/2010 | Goeldi | ............ | G06Q 10/00 379/265.09 |
| 2010/0225541 A1* | 9/2010 | Hertzog | ............ | G01S 5/0221 342/387 |
| 2013/0073336 A1* | 3/2013 | Heath | ............ | G06Q 30/02 705/7.29 |
| 2014/0172837 A1* | 6/2014 | Sommer | ............ | G06Q 50/01 707/722 |
| 2015/0081713 A1* | 3/2015 | Alonso | ............ | G06Q 10/109 707/738 |

(Continued)

*Primary Examiner* — Bruce M Moser
(74) *Attorney, Agent, or Firm* — Schwegman Lundberg & Woessner, P.A.

(57) ABSTRACT

Among other things, embodiments of the present disclosure discussed herein help identify trending topics and generate customized data feeds that present trending topics to a user based on information in the user's social network profile. In some embodiments, users may select topics of interest to the user and the system can identity and present trending articles in the selected topic to the user via the user's newsfeed.

18 Claims, 6 Drawing Sheets

(56) References Cited

U.S. PATENT DOCUMENTS

| | | | |
|---|---|---|---|
| 2015/0161633 A1* | 6/2015 | Adams | G06Q 30/0204 |
| | | | 705/7.33 |
| 2016/0034571 A1* | 2/2016 | Setayesh | G06F 16/353 |
| | | | 707/738 |
| 2016/0224675 A1* | 8/2016 | Li | H04L 67/306 |
| 2016/0314113 A1* | 10/2016 | Moharrami | G06F 40/284 |
| 2016/0357872 A1* | 12/2016 | Fader | G06Q 10/00 |
| 2017/0220677 A1* | 8/2017 | Kazi | G06F 16/35 |
| 2018/0149380 A1* | 5/2018 | Avedon | F24F 7/007 |

\* cited by examiner

FIG. 6

CUSTOMIZED DATA FEEDS FOR ONLINE SOCIAL NETWORKS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright LinkedIn, All Rights Reserved.

BACKGROUND

As the popularity of online, Internet-based social networks continues to grow, there is an increasing need for content hosts and providers (as well as others) to efficiently and effectively present content to online social network users. Among other things, embodiments of the present disclosure help identify trending topics and generate customized data feeds that present trending topics to a user based on information in the user's social network profile.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 5 and 6 are screenshots illustrating aspects of the method depicted in FIG. 2.

DETAILED DESCRIPTION

In the following, a detailed description of examples will be given with references to the drawings. It should be understood that various modifications to the examples may be made. In particular, elements of one example may be combined and used in other examples to form new examples. Many of the examples described herein are provided in the context of a social or business networking website or service. However, the applicability of the embodiments in the present disclosure are not limited to a social or business networking service.

Among other things, embodiments of the present disclosure discussed herein help identify trending topics and generate customized data feeds that present trending topics to a user based on information in the user's social network profile. In some embodiments, users may select topics of interest to the user and the system can identity and present trending articles in the selected topic to the user via the user's newsfeed.

Figure 1:
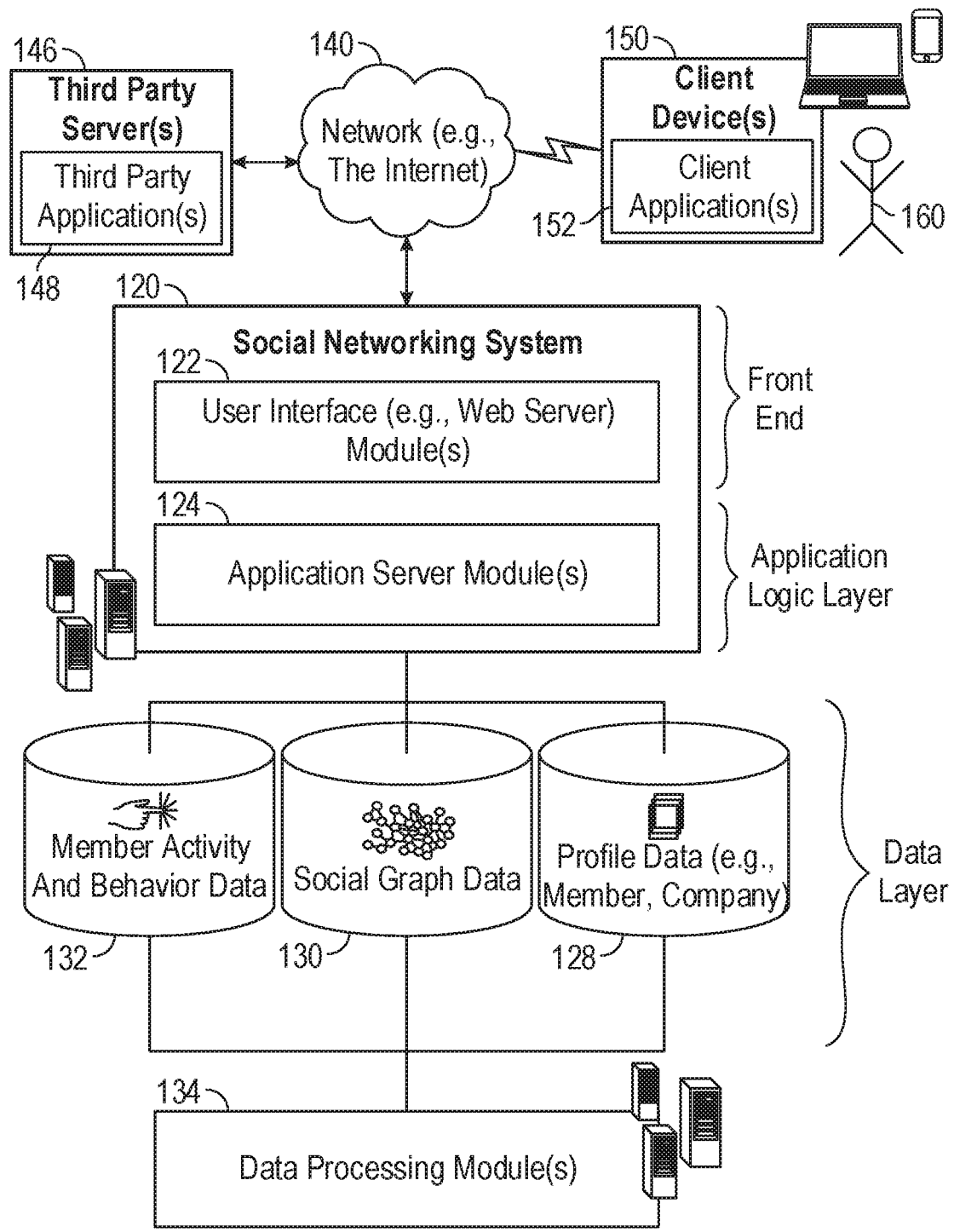
FIG. 1 is a block diagram illustrating a client-server system, according to various exemplary embodiments.

FIG. 1 illustrates an exemplary client-server system that may be used in conjunction with various embodiments of the present disclosure. The social networking system 120 may be based on a three-tiered architecture, including (for example) a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. Various additional functional modules and engines may be used with the social networking system illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the embodiments of the present disclosure are not limited to such architecture.

An Internet-based social networking service is a web-based service that enables users (also referred to herein as "members") to establish links or connections with persons for the purpose of sharing information with one another. Some social network services aim to enable friends and family to communicate and share with one another, while others are specifically directed to business users with a goal of facilitating the establishment of professional networks and the sharing of business information.

For purposes of the present disclosure, the terms "social network" and "social networking service" are used in a broad sense and are meant to encompass services aimed at connecting friends and family (often referred to simply as "social networks"), as well as services that are specifically directed to enabling business people to connect and share business information (also commonly referred to as "social networks" but sometimes may be referred to as "business networks" or "professional networks").

Online social network platforms (also referred to herein as Internet-based social networks) provide a variety of information and content to users of the social network, such as articles on various topics, updates related to a user and individuals within the user's network, job opportunities, friend (or connection) suggestions, advertisements, news stories, and the like.

As shown in FIG. 1, the front end layer consists of a user interface module(s) (e.g., a web server) 122, which receives content requests from various computing devices including one or more user computing device(s) 150, and communicates appropriate responses to the requesting device. For example, the user interface module(s) 122 may receive requests in the form of Hypertext Transport Protocol (HTTP) requests, or other web-based, application programming interface (API) requests. The user device(s) 150 may be executing conventional web browser applications and/or applications (also referred to as "apps") that have been developed for a specific platform to include any of a wide variety of mobile computing devices and mobile-specific operating systems.

For example, user device(s) 150 may be executing user application(s) 152. The user application(s) 152 may provide functionality to present information to the user and communicate via the network 140 to exchange information with the social networking system 120. Each of the user devices 150 may comprise a computing device that includes at least a display and communication capabilities with the network 140 to access the social networking system 120. The user devices 150 may comprise, but are not limited to, remote devices, work stations, computers, general purpose computers, Internet appliances, hand-held devices, wireless devices, portable devices, wearable computers, cellular or mobile phones, personal digital assistants (PDAs), smart phones, smart watches, tablets, ultrabooks, netbooks, laptops, desktops, multi-processor systems, microprocessor-based or programmable consumer electronics, game consoles, set-top boxes, network PCs, mini-computers, and the like. One or more users 160 may be a person, a machine, or other entity interacting with the client device(s) 150. The user(s) 160 may interact with the social networking system 120 via the user device(s) 150. The user(s) 160 may not necessarily be part of the networked environment, but may be associated with user device(s) 150.

For example, the user 160 may, using the user's client device 150, submit a request for web page content (e.g., by entering or selecting a web page address via a web browser) hosted by a third party server 146 and/or social networking system 120. The server 146 and/or social networking system 120 may, in response to the request, cause web page content to display on a display screen coupled to the client device 150, and to classify the web content as described in more detail below.

As shown in FIG. 1, the data layer includes several databases, including a database 128 for storing data for various entities of a social graph. In some exemplary embodiments, a "social graph" is a mechanism used by an online social networking service (e.g., provided by the social networking system 120) for defining and memorializing, in a digital format, relationships between different entities (e.g., people, employers, educational institutions, organizations, groups, etc.). Frequently, a social graph is a digital representation of real-world relationships. Social graphs may be digital representations of online communities to which a user belongs, often including the members of such communities (e.g., a family, a group of friends, alums of a university, employees of a company, members of a professional association, etc.). The data for various entities of the social graph may include member profiles, company profiles, educational institution profiles, as well as information concerning various online or offline groups. With various alternative embodiments, any number of other entities may be included in the social graph, and as such, various other databases may be used to store data corresponding to other entities. For example, the data layer may include one or more databases for storing webpage metadata.

In some embodiments, when a user initially registers to become a member of the social networking service, the person is prompted to provide some personal information, such as the person's name, age (e.g., birth date), gender, interests, contact information, home town, address, the names of the member's spouse and/or family members, educational background (e.g., schools, majors, etc.), current job title, job description, industry, employment history, skills, professional organizations, interests, and so on. This information is stored, for example, as profile data in the database 128.

Once registered, a member may invite other members, or be invited by other members, to connect via the social networking service. A "connection" may specify a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking system. With some embodiments, because the content selection algorithm selects content relating to or associated with the particular entities that a member is connected with or is following, as a member connects with and/or follows other entities, the universe of available content items for presentation to the member in his or her content stream increases. As members interact with various applications, content, and user interfaces of the social networking system 120, information relating to the member's activity and behavior may be stored in a database, such as the database 132.

The social networking system 120 may provide a broad range of other applications and services that allow members the opportunity to share and receive information, often customized to the interests of the member. For example, with some embodiments, the social networking system 120 may include a photo sharing application that allows members to upload and share photos with other members. With some embodiments, members of the social networking system 120 may be able to self-organize into groups, or interest groups, organized around a subject matter or topic of interest. With some embodiments, members may subscribe to or join groups affiliated with one or more companies. For instance, with some embodiments, members of the social networking service may indicate an affiliation with a company at which they are employed, such that news and events pertaining to the company are automatically communicated to the members in their personalized activity or content streams. With some embodiments, members may be allowed to subscribe to receive information concerning companies other than the company with which they are employed. Membership in a group, a subscription or following relationship with a company or group, as well as an employment relationship with a company, are all examples of different types of relationships that may exist between different entities, as defined by the social graph and modeled with social graph data of the database 130. In some exemplary embodiments, members may receive advertising targeted to them based on various factors (e.g., member profile data, social graph data, member activity or behavior data, etc.)

The application logic layer includes various application server module(s) 124, which, in conjunction with the user interface module(s) 122, generates various user interfaces with data retrieved from various data sources or data services in the data layer. With some embodiments, individual application server modules 124 are used to implement the functionality associated with various applications, services, and features of the social networking system 120. For instance, a messaging application, such as an email application, an instant messaging application, or some hybrid or variation of the two, may be implemented with one or more application server modules 124. A photo sharing application may be implemented with one or more application server modules 124. Similarly, a search engine enabling users to search for and browse member profiles may be implemented with one or more application server modules 124.

Further, as shown in FIG. 1, a data processing module 134 may be used with a variety of applications, services, and features of the social networking system 120. The data processing module 134 may periodically access one or more of the databases 128, 130, and/or 132, process (e.g., execute batch process jobs to analyze or mine) profile data, social graph data, member activity and behavior data, and generate analysis results based on the analysis of the respective data. The data processing module 134 may operate offline. According to some exemplary embodiments, the data processing module 134 operates as part of the social networking system 120. Consistent with other exemplary embodiments, the data processing module 134 operates in a separate system external to the social networking system 120. In some exemplary embodiments, the data processing module 134 may include multiple servers of a large-scale distributed storage and processing framework, such as Hadoop servers, for processing large data sets. The data processing module 134 may process data in real time, according to a schedule, automatically, or on demand. In some embodiments, the data processing module 134 may perform (alone or in conjunction with other components or systems) the functionality of method 200 depicted in FIG. 2 and described in more detail below.

Additionally, a third party application(s) 148, executing on a third party server(s) 146, is shown as being communicatively coupled to the social networking system 120 and the user device(s) 150. The third party servers) 146 may support one or more features or functions on a website hosted by the third party.

Figure 2:
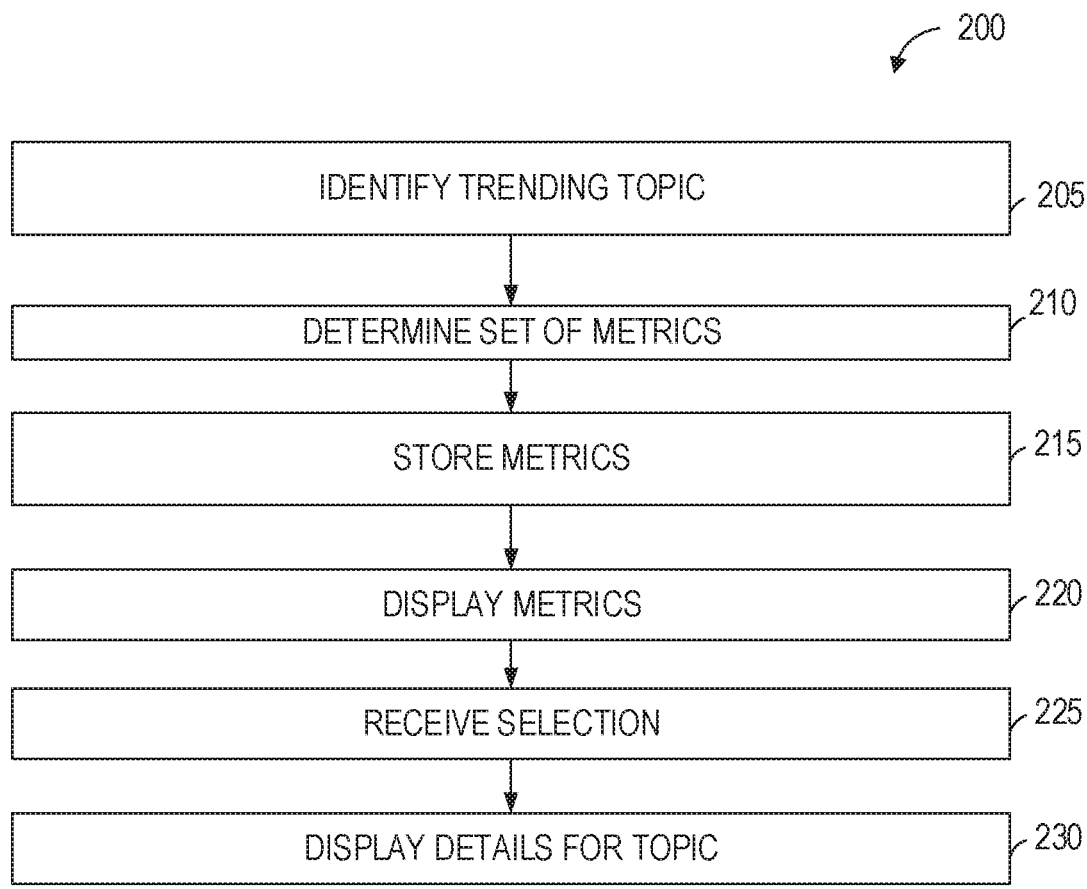
FIG. 2 is a flow diagram of a method according to various exemplary embodiments.

FIG. 2 illustrates an exemplary method 200 for classifying web page content according to various aspects of the present disclosure. Embodiments of the present disclosure may practice the steps of method 200 in whole or in part, and in conjunction with any other desired systems and methods. The functionality of method 200 may be performed, for example, using any combination of the systems depicted in FIGS. 1, 3, and/or 4.

In this example, method 200 includes identifying a trending topic on an online social network (205), determining a set of metrics for the identified trending topic (210), storing the set of metrics in a database (215), causing the set of metrics to display on a computing device of a user of the social network (220), receiving a selection of a link associated with the trending topic from the computing device of the user (225), and displaying details associated with the topic in response to the selection (230).

An online social network is a type of networked service provided by one or more computer systems accessible over a network that allows users/members of the service to build or reflect social networks or social relations among members. Members may be individuals or organizations. Typically, members construct profiles, which may include personal information such as the member's name, contact information, employment information, photographs, personal messages, status information, multimedia, links to web-related content, blogs, and so on. In order to build or reflect the social networks or social relations among members, the social networking service allows members to identify, and establish links or connections with other members. For instance, in the context of a business networking service (a type of social networking service), a member may establish a link or connection with his or her business contacts, including work colleagues, clients, customers, personal contacts, and so on. With a social networking service, a member may establish links or connections with his or her friends, family, or business contacts. While a social networking service and a business networking service may be generally described in terms of typical use cases (e.g., for personal and business networking respectively), it will be understood by one of ordinary skill in the art with the benefit of Applicant's disclosure that a business networking service may be used for personal purposes (e.g., connecting with friends, classmates, former classmates, and the like) as well as, or instead of, business networking purposes; and a social networking service may likewise be used for business networking purposes as well as or in place of social networking purposes. A connection may be formed using an invitation process in which one member "invites" a second member to form a link. The second member then has the option of accepting or declining the invitation.

In general, a connection or link represents or otherwise corresponds to an information access privilege, such that a first member who has established a connection with a second member is, via the establishment of that connection, authorizing the second member to view or access certain non-publicly available portions of their profiles that may include communications they have authored. Example communications may include blog posts, messages, "wall" postings, or the like. Of course, depending on the particular implementation of the business/social networking service, the nature and type of the information that may be shared, as well as the granularity with which the access privileges may be defined to protect certain types of data may vary.

Some social networking services may offer a subscription or "following" process to create a connection instead of, or in addition to the invitation process. A subscription or following model is where one member "follows" another member without the need for mutual agreement. Typically in this model, the follower is notified of public messages and other communications posted by the member that is followed. An example social networking service that follows this model is Twitter®—a micro-blogging service that allows members to follow other members without explicit permission. Other connection-based social networking services also may allow following-type relationships as well. For example, the social networking service LinkedIn® allows members to follow particular companies.

As part of their member profiles, members may include information on their current position of employment. Information on their current position includes their title, company, geographic location, industry, and periods of employment. The social networking service may also track skills that members possess and when they learned those skills. Skills may be automatically determined by the social networking service based upon member profile attributes of the member, or may be manually entered by the member.

Online social networks (such as LinkedIn) increasingly receive a tremendous amount of data, both structured and unstructured. Such data includes the links users click on, mentions of products by members in posts on the social network, and metadata information including dates, locations, members' engagement history, hyperlinks, etc. Among other things, the embodiments of the present disclosure help allow users of online social networks to subscribe to the topics they are interested in. The system can identify trending topics of interest to the user, and surface both analytical and transactional information on the user's Feed page related to such topics. Users can glance through recommended verbatim highlights directly without drilling down multiple steps, but can also retrieve additional details on topics they're interested in via selectable links or other constructs.

Referring again to method 200 in FIG. 2, embodiments of the present disclosure may identify (205) any number of trending topics from any number of different sources and in any format. For example, a server computer system (e.g., hosting a social networking system 120 depicted in FIG. 1) may receive articles, posts, and other content from one or more client computing devices 150 each associated with a respective user (e.g., member of the social network) over a network 140 such as the Internet. Content may also be generated by administrators of the social network, third party content providers, and other sources.

The social networking system 120 may analyze the content of the social network to identify one or more topics associated with each piece of content. For example, system may analyze a news article regarding fluctuations in the price of oil due to political tensions and identify topics for the article such as "business news," "geopolitical news," "commodity prices," etc. Furthermore, the system may analyze the interactions of the users on the social network with such content to identify topics that users are expressing interest in. In this context, a "trending" topic may be identified by the system based on user interaction, identified by a content provider (e.g., as a topic the content provider wishes to advertise or promote), or based on any other desired criteria.

Embodiments of the present disclosure can quickly and efficiently identify trending topics in a variety of different settings. For example, the system may identify trending topics related to news and public relations events, including those related to the online social network itself. For example, the system can identify breaking news such as new product releases, stock market and earnings related mentions, as well as related discussions among users of the social network.

The system may also identify trending topics related to trust and safety alerts. For example, the system may identify concerns and social alarms from users of the online social network on various escalation items, such as members commenting on issues related to terrorism and other security concerns, fraud, scams, viruses, and the like.

The system may identify a trending topic on the online social network based on user interactions with content items identified as having a common topic. For example, the system may identify a trending topic based on the number of times an article or other content item associated with a topic is selected by users of the online social network (e.g., the total number of times or the number of times within a predetermined time period). Trending topics may also be identified based on the number of times a keyword (or set of keywords) associated with the topic is used throughout various content. For example, referring to section 610 of the screenshot 600 depicted in FIG. 6, the system may track the number of times a topic (or a keyword associated with the topic) is mentioned in content posted to the online social network.

In method 200, the system determines a set of metrics (210) associated with an identified trending topic. Embodiments of the present disclosure may determine any number of different metrics for any number of topics. For example, various content items on the online social network (e.g., news stories, articles, user posts, etc.) may be analyzed to determine whether each content item is relevant to a trending topic identified (205) by the system. The system may analyze any desired format of content, such as text, images, video, and audio in a particular content item and assign a rating to the particular content item reflecting its relevance to the trending topic. In such cases, content items having a rating above a predetermined threshold may be associated by the system with the topic.

In some embodiments, the system may determine one or more keywords associated with a trending topic, and determine a volume of mentions of the keyword on the online social network. The volume of such mentions can be tracked in total, as well as over predetermined time periods. In some embodiments, the system may compare the number of mentions during different time periods. For example, the system may compare the number of mentions on a daily, weekly, and/or monthly basis to determine shorter-term and longer-term trends in the interest for a particular topic. One hundred mentions for a topic in a first week and 150 mentions in a subsequent second week might indicate an increase in interest by the users of the social network for the topic, and/or an increase in the number of articles and other content associated with the topic.

By tracking metrics over different time periods, the system may detect early signs of "viral" mentions, or topics that gain considerable popularity (usually over a short period of time). The system can share such topics with users via the online social network, thus providing an early source for popular topics and current events compared to other platforms. The system can also identify topics that trend in varying popularity with different groups (e.g., professional groups, demographic groups, etc.). For example, the system may identify topics that are popular with millennials, topics that are popular with software engineers, etc. This information may then be used, for example, to identify topics to send to the feeds of others within the identified group(s), while excluding such topics from the feeds of those who are not members of the identified group(s).

Embodiments of the present disclosure may determine metrics related to the sentiment of articles, posts, and other content related to a trending topic, such as a keyword associated with a trending topic. For example, the system may analyze comments by users of the social network that include a keyword associated with a trending topic to identify posts that have a positive sentiment associated with the mention of the keyword, negative sentiment associated with the mention of the keyword, and/or neutral sentiment associated with the mention of the keyword. As noted above, the system may track such sentiment metrics over various time periods. For example, referring again to FIG. 6, screenshot 600 illustrates the total number of mentions for trending topics 620 and 630, along with the percentage of positive mentions (4% and 9%, respectively) and the percentage of negative mentions (6% and 7%, respectively), with the remainder of mentions being classified as neutral.

The system may store (215) the metrics for trending topics one or more databases (such as databases 128, 130, and/or 132 in FIG. 1) and cause the set of metrics to display (220) on the respective display screens of one or more computing devices. For example, the system may display the metrics on the display screen of a client computing device associated with a user of the online social network, such as client device 150 connected to the Social Networking System 120 via the Internet 140 in FIG. 1. The system may display metrics for a trending topic based on individual user preferences and selections, thus allowing different users to see different trending topics and different metrics.

Figure 5:

In some embodiments, the social networking system 120 may provide a web interface or other graphical user interface feature to allow users to submit information related to the trending topics the user wishes to see in his/her feed. For instance, FIG. 5 illustrates an exemplary screenshot 500 having a toolbar 510 with different topic categories and a display area 520 beneath the toolbar 520 where the user selects specific topics he/she is interested in. In this example the user has selected the "value propositions" tab and the "stay connected and informed" topic.

Figure 6:
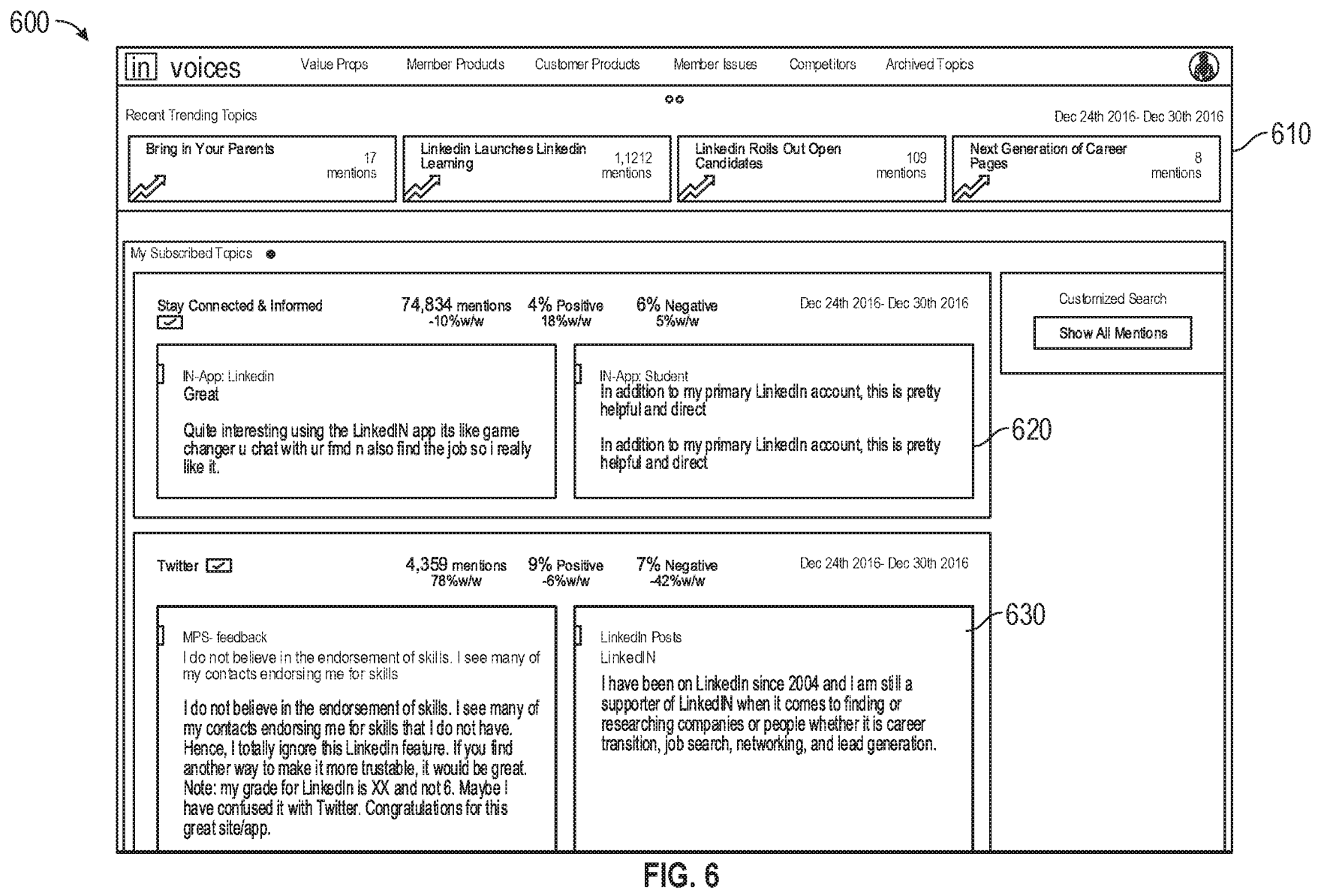

FIG. 6 illustrates an exemplary screenshot 600 displaying trending topics and information for such topics (such as metrics determined for the trending topics as discussed above). In this example, screenshot 600 includes a trending topic related to the "stay connected and informed" topic selected by the user in FIG. 5 (topic 620) as well as a trending topic related to "Twitter" 630 selected by the user from one of the other tabs in the toolbar 520 or provided by the system. In some embodiments the system may automatically display trending topics to the user based on information from the user's profile, such as the user's experience, interests, and other information. Users may remove trending topics from their feed in screen 600 by unchecking the checkbox underneath the topic caption.

Additionally, the caption summarizing the trending topic (e.g., "stay connected informed" and "Twitter" in FIG. 6) may comprise a selectable link or other user interface component. The system may receive selection (225) of the topic heading (e.g., by the user clicking on the link via the user's computing device) and, in response to receiving the selection, the system may display (230) further information and/or details associated with the topic on the display screen of the user's computing device. In some embodiments, for example, selection of the topic "stay connected and informed" topic may display information on the types of articles associated with the topic, as well as options for the user to filter the types of articles and other content the user receives in the user's feed for that topic.

In the example shown in FIG. 6, screen 600 includes a set of recent trending topics 610, along with the total number of mentions for each topic. The screen 600 further shows, for topics 620 and 630, the total number of mentions for the topics the user has subscribed to via the screen 500 in FIG. 5, as well as the percentage of negative and positive mentions for each topic. Additionally, the system depicts the week-to-week ("w/w") change in mentions, thus the number of mentions for topic 620) are down 10% from the prior week, while the mentions for topic 630 are up 78% from the prior week.

Accordingly, the data analytic solutions of the present disclosure can help provide relevant information to different users by recording user preferences explicitly (through subscription), tracking usage patterns, understanding users' roles and responsibilities through identity, inferring session objectives, incorporating additional signals from a user's organization, tracking trending topics, and/or company and organizational objectives for the user. In some embodiments, the system may expose a set of application program interface functions to allow other systems to access the functionality of the system and allow users to select specific meta data, time series, charting options, algorithms, and other information and functionality.

The system may also embed complicated data analytics in pre-built queries so business users can access information through a simple search function in our library of pre-built queries (e.g., via the "Customized Search" construct in FIG. 6. The queries may be pre-built by the system based on patterns of queries performed by other users and the data resulting from such searches. In addition, users may have the option to build their own queries (e.g., using boolean statements).

Machine learning algorithms may be employed in conjunction with embodiments of the present disclosure to optimize identification and presentation of trending topics to users. For example, the system may gather training data based on the daily workflows of users of the online social network, and optimize the features for each algorithm based on individual use cases, such as signal-to-noise ratio tolerance, what users consider to be sentiment, trending, and prioritization and escalation signals. Queries may be customized to a hurdle rate level, allowing the system to define the optimal signal-to-noise ratio for the machine learning algorithms specific to users' individual use cases at session level.

Figure 3:
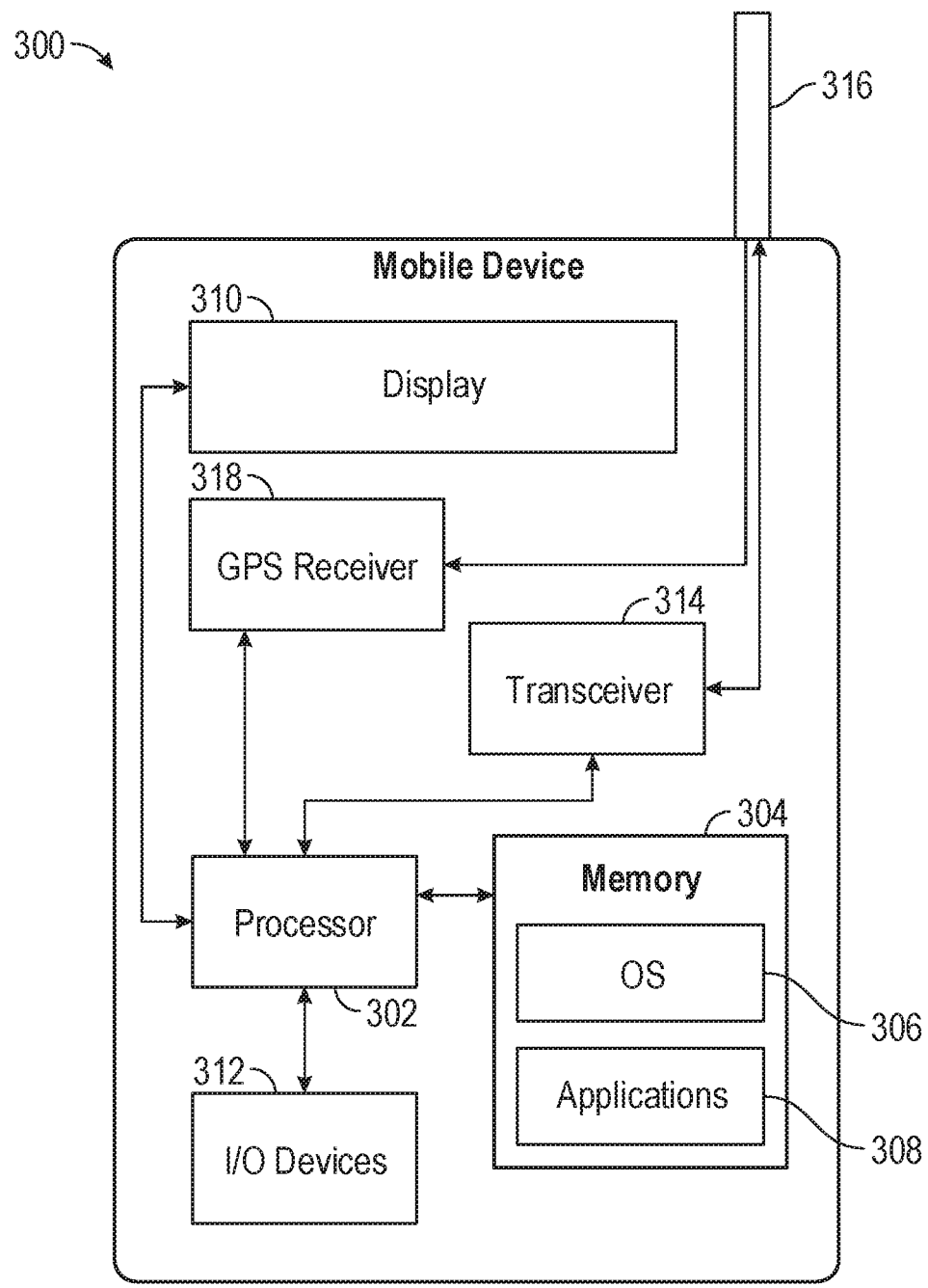
FIG. 3 is a block diagram illustrating an exemplary mobile device.

FIG. 3 is a block diagram illustrating a mobile device 300, according to an exemplary embodiment. The mobile device 300 may be (or include) a client device 150 (in FIG. 1) or any other device operating in conjunction with embodiments of the present disclosure. The mobile device 300 may include a processor 302. The processor 302 may be any of a variety of different types of commercially available processors 302 suitable for mobile devices 300 (for example, an XScale architecture microprocessor, a microprocessor without interlocked pipeline stages (MIPS) architecture processor, or another type of processor 302). A memory 304, such as a random access memory (RAM), a flash memory, or other type of memory, is typically accessible to the processor 302. The memory 304 may be adapted to store an operating system (OS) 306, as well as application programs 308, such as a mobile location enabled application that may provide LBSs to a user. The processor 302 may be coupled, either directly or via appropriate intermediary hardware, to a display 310 and to one or more input/output (I/O) devices 312, such as a keypad, a touch panel sensor, a microphone, and the like. Similarly, in sonic embodiments, the processor 302 may be coupled to a transceiver 314 that interfaces with an antenna 316. The transceiver 314 may be configured to both transmit and receive cellular network signals, wireless data signals, or other types of signals via the antenna 316, depending on the nature of the mobile device 300. Further, in some configurations, a UPS receiver 318 may also make use of the antenna 316 to receive UPS signals.

Certain embodiments may be described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In exemplary embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors or processor-implemented modules, not only residing within a single machine, but deployed across a number of machines. In some exemplary embodiments, the one or more processors or processor-implemented modules may be located in a single location (e.g., within a home environment, an office environment or as a server farm), while in other embodiments the one or more processors or processor-implemented modules may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Exemplary embodiments may be implemented in digital electronic circuitry, or in computer hardware, firmware, software, or in combinations of them. Exemplary embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In exemplary embodiments, operations may be performed by one or more programmable processors executing a computer program to perform functions by operating on input data and generating output. Method operations can also be performed by, and apparatus of exemplary embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice.

Figure 4:
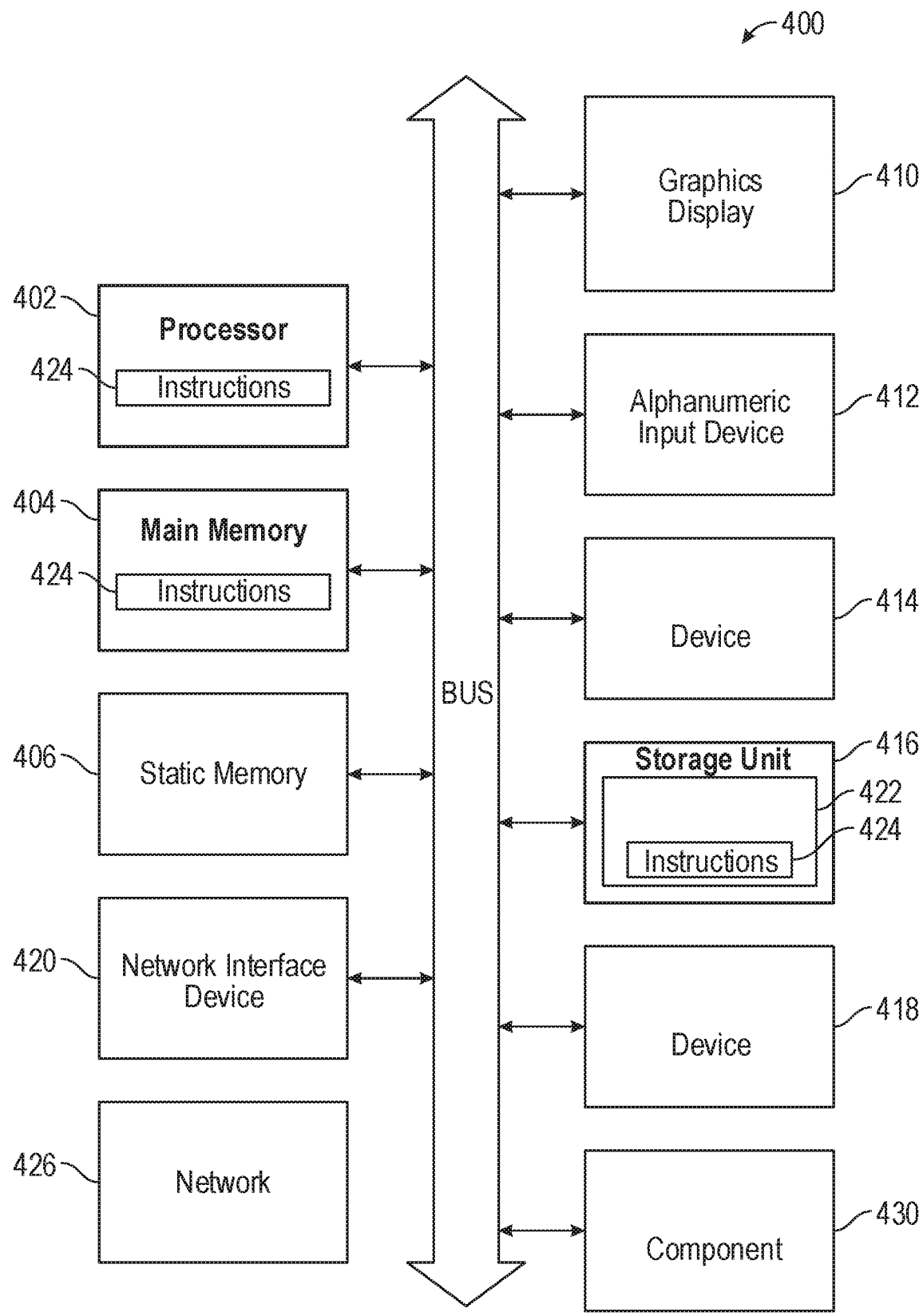
FIG. 4 is a block diagram illustrating components of an exemplary computer system.

FIG. 4 is a block diagram illustrating components of a machine 400, according to some exemplary embodiments, able to read instructions 424 from a machine-readable medium 422 (e.g., a non-transitory machine-readable medium, a machine-readable storage medium, a computer-readable storage medium, or any suitable combination thereof) and perform any one or more of the methodologies discussed herein, in whole or in part. Specifically, FIG. 4 shows the machine 400 in the example form of a computer system within which the instructions 424 (e.g., software, a program, an application, an applet, or other executable code)

for causing the machine 400 to perform any one or more of the methodologies discussed herein may be executed, in whole or in part.

In alternative embodiments, the machine 400 operates as a standalone device or may be connected (e.g., networked) to other machines. In a networked deployment, the machine 400 may operate in the capacity of a server machine or a client machine in a server-client network environment, or as a peer machine in a distributed (e.g., peer-to-peer) network environment. The machine 400 may be a server computer, a client computer, a personal computer (PC), a tablet computer, a laptop computer, a netbook, a cellular telephone, a smartphone, a set-top box (STB), a personal digital assistant (FDA), a web appliance, a network router, a network switch, a network bridge, or any machine capable of executing the instructions 424, sequentially or otherwise, that specify actions to be taken by that machine. Further, while only a single machine is illustrated, the term "machine" shall also be taken to include any collection of machines that individually or jointly execute the instructions 424 to perform all or part of any one or more of the methodologies discussed herein.

The machine 400 includes a processor 402 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 404, and a static memory 406, which are configured to communicate with each other via a bus 408. The processor 402 may contain microcircuits that are configurable, temporarily or permanently, by some or all of the instructions 424 such that the processor 402 is configurable to perform any one or more of the methodologies described herein, in whole or in part. For example, a set of one or more microcircuits of the processor 402 may be configurable to execute one or more modules (e.g., software modules) described herein.

The machine 400 may further include a graphics display 410 (e.g., a plasma display panel (PDP), a light emitting diode (LED) display, a liquid crystal display (LCD), a projector, a cathode ray tube (CRT), or any other display capable of displaying graphics or video). The machine 400 may also include an alphanumeric input device 412 (e.g., a keyboard or keypad), a cursor control device 414 (e.g., a mouse, a touchpad, a trackball, a joystick, a motion sensor, an eye tracking device, or other pointing instrument), a storage unit 416, an audio generation device 418 (e.g., a sound card, an amplifier, a speaker, a headphone jack, or any suitable combination thereof), and a network interface device 420.

The storage unit 416 includes the machine-readable medium 422 (e.g., a tangible and non-transitory machine-readable storage medium) on which are stored the instructions 424 embodying any one or more of the methodologies or functions described herein. The instructions 424 may also reside, completely or at least partially, within the main memory 404, within the processor 402 (e.g., within the processor's cache memory), or both, before or during execution thereof by the machine 400. Accordingly, the main memory 404 and the processor 402 may be considered machine-readable media (e.g., tangible and non-transitory machine-readable media). The instructions 424 may be transmitted or received over the network 426 via the network interface device 420. For example, the network interface device 420 may communicate the instructions 424 using any one or more transfer protocols (e.g., hypertext transfer protocol (HTTP)).

In some exemplary embodiments, the machine 400 may be a portable computing device, such as a smart phone or tablet computer, and have one or more additional input components 430 (e.g., sensors or gauges). Examples of such input components 430 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 422 is shown in an exemplary embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 424 for execution by the machine 400, such that the instructions 424, when executed by one or more processors of the machine 400 (e.g., processor 402), cause the machine 400 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various exemplary embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC, A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The performance of certain operations may be distributed among the one or more processors, not only residing within a single machine, but deployed across a number of machines. In some exemplary embodiments, the one or more processors or processor-implemented modules may be located in a single geographic location (e.g., within a home environment, an office environment, or a server farm). In other exemplary embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are legally entitled.

What is claimed is:

1. A method for generating customized data feeds comprising:
    accessing, by a server computer system, profile information of a user stored in a database of an online social network;
    identifying, by the server computer system, a trending topic on the online social network based on the accessed profile information of the user;
    causing, by the server computer system, a graphical user interface element to be displayed on a computing device associated with a user of an online social network, the graphical user interface element being configured to enable the user to select to subscribe to the identified trending topic;
    determining, by the server computer system, a set of metrics for the identified trending topic, wherein determining the set of metrics includes:
        determining a keyword associated with the trending topic; and
        determining a volume of mentions of the keyword on the online social network over a predetermined time period;
    storing, by the server computer system, the set of metrics for the trending topic in a database in communication with the server computer system; and
    causing, by the server computer system, the set of metrics to display on a display screen coupled to the computing device associated with the user of the online social network and in communication with the server computer system over the Internet, the displaying the set of metrics includes generating and displaying a caption summarizing the trending topic, the set of metrics being displayed in association with the caption summarizing the trending topic based on a selection by the user to subscribe to the trending topic via the graphical user interface element, the set of metrics and the caption summarizing the trending topic being displayed concurrently with other trending topics to which the user has subscribed and corresponding captions summarizing the other trending topics on a customized feed page for the user.

2. The method of claim 1, wherein the identifying the trending topic is based on one or more of: a total number of selections of an article associated with the trending topic and posted on the online social network, a number of selections of the article over a predetermined period of time, and a keyword included in the article.

3. The method of claim 1, wherein determining the set of metrics for the identified trending topic includes comparing a volume of mentions of the keyword on the online social network during a first period of time and a volume of mentions of the keyword on the online social network during a second period of time.

4. The method of claim 1, wherein determining the set of metrics for the identified trending topic includes determining one or more of: a positive sentiment associated with a mention of the keyword, a negative sentiment associated with a mention of the keyword, and a neutral sentiment associated with a mention of the keyword.

5. The method of claim 1, wherein displaying the set of metrics includes displaying the volume of mentions over the predetermined time period in conjunction with the caption.

6. The method of claim 1, wherein the caption comprises a selectable link.

7. The method of claim 6, further comprising:
    receiving a selection of the selectable link from the computing device associated with the user; and
    in response to the selection, displaying, by the server computer system, details associated with the topic on the display screen of the computing device associated with the user.

8. A system comprising:
    a processor; and
    memory coupled to the processor and storing instructions that, when executed by the processor, cause the system to perform operations for generating customized data feeds, the operations comprising:
        accessing profile information of a user stored in a database of an online social network;
        identifying a trending topic on the online social network based on the accessed profile information of the user;
        causing a graphical user interface element to be displayed on a computing device associated with a user of an online social network, the graphical user interface element being configured to enable the user to select to subscribe to the identified trending topic;
        determining a set of metrics for the identified trending topic, wherein determining the set of metrics includes:
            determining a keyword associated with the trending topic; and
            determining a volume of mentions of the keyword on the online social network over a predetermined time period;
        storing the set of metrics for the trending topic in a database in communication with the system; and
        causing the set of metrics to display on a display screen coupled to the computing device associated with the user of the online social network and in communication with the system over the Internet, the displaying the set of metrics includes generating and displaying a caption summarizing the trending topic, the set of metrics being displayed in association with the caption summarizing the trending topic based on a selection by the user to subscribe to the trending topic via the graphical user interface element, the set of metrics and the caption summarizing the trending topic being displayed concurrently with other trending topics to which the user has subscribed and corresponding captions summarizing the other trending topics on a customized feed page for the user.

9. The system of claim 8, wherein the identifying the trending topic is based on one or more of: a total number of selections of an article associated with the trending topic and posted on the online social network, a number of selections of the article over a predetermined period of time, and a keyword included in the article.

10. The system of claim 8, wherein determining the set of metrics for the identified trending topic includes comparing a volume of mentions of the keyword on the online social network during a first period of time and a volume of mentions of the keyword on the online social network during a second period of time.

11. The system of claim 8, wherein determining the set of metrics for the identified trending topic includes determining one or more of: a positive sentiment associated with a mention of the keyword, a negative sentiment associated with a mention of the keyword, and a neutral sentiment associated with a mention of the keyword.

12. The system of claim 8, wherein displaying the set of metrics includes displaying the volume of mentions over the predetermined time period in conjunction with the caption.

13. The system of claim 8, wherein the caption comprises a selectable link.

14. The system of claim 13, wherein the memory further stores instructions for causing the system to perform operations comprising:
  receiving a selection of the selectable link from the computing device associated with the user; and
  in response to the selection, displaying, by the server computer system, details associated with the topic on the display screen of the computing device associated with the user.

15. A tangible, non-transitory computer-readable medium storing instructions that, when executed by a server computer system, cause the server computer system to perform operations for generating customized data feeds, the operations comprising:
  accessing profile information of a user stored in a database of an online social network;
  identifying a trending topic on the online social network based on the accessed profile information of the user;
  causing a graphical user interface element to be displayed on a computing device associated with a user of an online social network, the graphical user interface element being configured to enable the user to select to subscribe to the identified trending topic;
  determining a set of metrics for the identified trending topic, wherein determining the set of metrics includes:
    determining a keyword associated with the trending topic; and
    determining a volume of mentions of the keyword on the online social network over a predetermined time period;
  storing the set of metrics for the trending topic in a database in communication with the server computer system; and
  causing the set of metrics to display on a display screen coupled to the computing device associated with the user of the online social network and in communication with the server computer system over the Internet, the displaying the set of metrics includes generating and displaying a caption summarizing the trending topic, the set of metrics being displayed in association with the caption summarizing the trending topic based on a selection by the user to subscribe to the trending topic via the graphical user interface element, the set of metrics and the caption summarizing the trending topic being displayed concurrently with other trending topics to which the user has subscribed and corresponding captions summarizing the other trending topics on a customized feed page for the user.

16. The non-transitory computer-readable medium of claim 15, wherein the identifying the trending topic is based on one or more of: a total number of selections of an article associated with the trending topic and posted on the online social network, a number of selections of the article over a predetermined period of time, and a keyword included in the article.

17. The non-transitory computer-readable medium of claim 15, wherein determining the set of metrics for the identified trending topic includes comparing a volume of mentions of the keyword on the online social network during a first period of time and a volume of mentions of the keyword on the online social network during a second period of time.

18. The non-transitory computer-readable medium of claim 15, wherein determining the set of metrics for the identified trending topic includes determining one or more of: a positive sentiment associated with a mention of the keyword, a negative sentiment associated with a mention of the keyword, and a neutral sentiment associated with a mention of the keyword.

* * * * *